US00RE37299E

(19) United States
(12) Reissued Patent
Amer et al.

(10) Patent Number: US RE37,299 E
(45) Date of Reissued Patent: Jul. 31, 2001

(54) ATOMIC FORCE MICROSCOPY

(75) Inventors: Nabil Mahmoud Amer, Armonk, NY (US); Gerhard Meyer, Berlin (DE)

(73) Assignee: International Business Machines Corporation, Armonk, NY (US)

(21) Appl. No.: 08/791,445

(22) Filed: Jan. 27, 1997

Related U.S. Patent Documents

Reissue of:
(64) Patent No.: 5,144,833
Issued: Sep. 8, 1992
Appl. No.: 07/588,795
Filed: Sep. 27, 1990

U.S. Applications:

(63) Continuation of application No. 08/692,653, filed on Aug. 6, 1996, now abandoned, which is a continuation of application No. 08/601,487, filed on Feb. 14, 1996, now abandoned, which is a continuation of application No. 08/301,856, filed on Sep. 7, 1994, now abandoned.

(51) Int. Cl.[7] ..... G01B 11/30
(52) U.S. Cl. ..... 73/105; 250/306; 356/376
(58) Field of Search ..... 73/105; 250/306, 250/307; 356/376, 445

(56) References Cited

U.S. PATENT DOCUMENTS

| | | | | |
|---|---|---|---|---|
| Re. 33,387 | * | 10/1990 | Binnig | 250/306 |
| 1,976,337 | * | 10/1934 | Firestone et al. | 73/105 |
| 2,048,154 | * | 7/1936 | Abbott et al. | 73/105 |
| 2,171,433 | * | 8/1939 | Powers | 73/105 |
| 2,205,517 | * | 6/1940 | Devol | 73/105 |
| 2,686,101 | * | 8/1954 | Davis | 73/105 X |
| 3,251,135 | * | 5/1966 | Reason | 73/105 X |
| 3,335,367 | * | 8/1967 | Skooglund et al. | 324/96 |
| 3,571,579 | * | 3/1971 | Whitehouse et al. | 73/105 X |
| 3,617,131 | * | 11/1971 | Taguchi | 356/152 |
| 3,782,205 | * | 1/1974 | Hand | 73/497 |
| 3,798,449 | * | 3/1974 | Reinheimer et al. | 250/201 |
| 4,102,577 | * | 7/1978 | Suzuki et al. | 356/376 |
| 4,267,732 | * | 5/1981 | Quate | 73/606 |
| 4,596,925 | * | 6/1986 | Gilby | 250/227 |
| 4,659,219 | * | 4/1987 | de Fleurieu et al. | 356/152 |
| 4,711,578 | * | 12/1987 | Chaimowicz | 356/375 |
| 4,724,318 | * | 2/1988 | Binnig | 250/306 |
| 4,739,161 | * | 4/1988 | Moriyama et al. | 250/227 |
| 4,745,270 | * | 5/1988 | Horikawa et al. | 250/216 |
| 4,762,996 | * | 8/1988 | Binnig et al. | 250/306 |

(List continued on next page.)

FOREIGN PATENT DOCUMENTS

| | | | | |
|---|---|---|---|---|
| 320326 | * | 6/1989 | (EP) | 356/376 |
| 304103 | * | 12/1988 | (JP) | 73/105 |
| 7256 | * | 8/1989 | (WO) | 250/306 |
| 4753 | * | 5/1990 | (WO) | 356/376 |

OTHER PUBLICATIONS

"Surface Emitting Semiconductor Lasers"; *IEEE Journal of Quantum Electronics*; vol. 24, No. 9, pp. 1845–1855; Sep. 1988; Kenichi Iga et al.*

H. Wickramasinghe, "Scanned–Probe Microscopes", Scientific American, Oct. 1989, pp. 98–105.*

A.L. Weisenhorn et al "Forces in Atomic Force Microscopy in air and water", Appl.Phys. Lett., 54(26 ), Jun. 26, 1989, pp. 2651–2653.*

(List continued on next page.)

*Primary Examiner*—Thomas P. Noland
(74) *Attorney, Agent, or Firm*—McGinn & Gibb, PLLC

(57) ABSTRACT

An atomic force microscope includes a tip mounted on a micromachined cantilever. As the tip scans a surface to be investigated, interatomic forces between the tip and the surface induce displacement of the tip. A laser beam is transmitted to and reflected from the cantilever for measuring the cantilever orientation. In a preferred embodiment the laser beam has an elliptical shape. The reflected laser beam is detected with a position-sensitive detector, preferably a bicell. The output of the bicell is provided to a computer for processing of the data for providing a topographical image of the surface with atomic resolution.

28 Claims, 2 Drawing Sheets

U.S. PATENT DOCUMENTS

| | | | | |
|---|---|---|---|---|
| 4,770,533 | * | 9/1988 | Suwa | 356/375 |
| 4,782,239 | * | 11/1988 | Hirose et al. | 250/561 |
| 4,800,274 | * | 1/1989 | Hansma et al. | 250/306 |
| 4,806,755 | * | 2/1989 | Duerig et al. | 250/306 |
| 4,823,004 | * | 4/1989 | Kaiser et al. | 250/306 |
| 4,827,091 | * | 5/1989 | Behr | 200/61.45 M |
| 4,837,435 | * | 6/1989 | Sakuhara et al. | 250/307 X |
| 4,851,671 | * | 7/1989 | Pohl | 250/306 |
| 4,861,990 | * | 8/1989 | Coley | 250/306 |
| 4,873,401 | * | 10/1989 | Ireland | 200/61.45 M |
| 4,878,114 | * | 10/1989 | Huynh et al. | 73/105 X |
| 4,883,959 | * | 11/1989 | Hosoki et al. | 250/306 |
| 4,889,988 | * | 12/1989 | Elings et al. | 250/306 |
| 4,894,537 | * | 1/1990 | Blackford et al. | 250/306 |
| 4,896,044 | * | 1/1990 | Li et al. | 250/492.3 |
| 4,935,634 | * | 6/1990 | Hansma et al. | 250/306 X |
| 4,992,728 | * | 2/1991 | McCord et al. | 250/306 X |
| 5,003,815 | * | 4/1991 | Martin et al. | 73/105 |
| 5,015,850 | * | 5/1991 | Zdeblick et al. | 250/306 |
| 5,051,379 | * | 9/1991 | Bayer et al. | 250/306 X |
| 5,053,588 | * | 10/1991 | Bolender | 200/61.45 R |

OTHER PUBLICATIONS

Binnig et al, "Atomic Force Microscope", Phys. Rev. Lett. vol. 56, No. 9, Mar. 1986, pp. 930–933.*

B. Drake et al., "Imaging Crystals, Polymers and Processes in Water with the Atomic Force Microscope", *Science*, vol. 243, pp. 1586–1589, Mar. 24, 1989.*

IBM TDB "Lateral Forces and Topography Using the Scanning Tunneling Microscope and Optical Densing of the Tip Position", vol. 32, No. 3A, Aug. 1989 pp. 250–251.*

G.M. McClelland et al, "Atomic Force Microscopy, General Principles and New Implementation", IBM Research Report, RJ5368, Nov. 4, 1986 pp. 1–8.*

D. Ruger et al, "Force Microscope Using A Fiber–Optic Displacement Sensor", Review of Scientific Instruments, vol. 59, No. 11, Nov. 1, 1988, New York, pp. 2337–2340.*

Y. Martin et al, Atomic force microscope—force mapping and profiling on a sub 100–Å scale, J. Appl. Phys., 61,(10), May 15, 1987, pp. 4723–4729.*

G. Meyer et al, "Novel Optical Approach to Atomic Force Microscopy", Appl. Phys. Lett., 53(12), Sep. 19, 1988, pp. 1045–1047.*

S. Alexander et al, "An atomic–resolution atomic–force microscope implemented using an optical lever", J. Appl. Phys., 65(1), Jan. 1, 1989, pp. 164–167.*

D. Ruger et al, "Improved Fiber–Optic Interferometer For Atomic Force Microscopy", Applied Physics Letters, vol. 55, No. 25, Dec. 18, 1989, New York, pp. 2588–2590.*

S.A. Chalmers et al, "Determination of Tilted Superlattice Structure By Atomic Force Microscopy", Applied Physics Letters, vol. 55, No. 24, Dec. 11, 1989, New York, pp. 2491–2493.*

"Compact Interferometric Force Sensor", IBM Technical Disclosure Bulletin, vol. 32, No. 2, Jul. 1, 1989, New York, pp. 416–417.*

* cited by examiner

ATOMIC FORCE MICROSCOPY

Matter enclosed in heavy brackets [ ] appears in the original patent but forms no part of this reissue specification; matter printed in italics indicates the additions made by reissue.

*This reissue application is a continuation of reissue application No. 08/692,653, filed on Aug. 6, 1996, now abandoned, which is a continuation of reissue application No. 08/601,487, filed on Feb. 14, 1996, now abandoned, which is a continuation of reissue application No. 08/301, 856, filed Sep. 7, 1994, now abandoned, which is a reissue application for the reissue of U.S. Pat. No. 5,144,833 granted Sep. 8, 1992 upon U.S. patent application No. 07/588,795, filed Sep. 27, 1990.*

BACKGROUND OF THE INVENTION

The present invention relates to atomic force microscopy and specifically to an atomic force microscope which employs a micromachined cantilever beam in order to achieve atomic resolution. In addition, the atomic force microscope is capable of operation in vacuum, air or liquid environments, of scanning a large surface area and of providing common mode rejection for improved operation.

Atomic force microscopy is based upon the principle of sensing the forces between a sharp stylus or tip and the surface to be investigated. The interatomic forces induce the displacement of the stylus mounted on the end of a cantilever beam. In its original implementation, a tunneling junction was used to detect the motion of the stylus attached to an electrically conductive cantilever beam. Subsequently, optical interferometry was used to detect cantilever beam deflection.

As described by G. Binnig et al, in Phys. Rev. Lett., vol. 56, No. 9, March 1986, pp. 930–933, a sharply pointed tip is attached to a spring-like cantilever beam to scan the profile of a surface to be investigated. The attractive or repulsive forces occurring between the atoms at the apex of the tip and those of the surface result in tiny deflections of the cantilever beam. The deflection is measured by means of a tunneling microscope. That is, an electrically conductive tunnel tip is disposed within the tunnel distance from the back of the cantilever beam, and the variations of the tunneling current are indicative of the beam deflection. The forces occurring between the tip and the surface under investigation are determined from the measured beam deflection and the characteristics of the cantilever beam.

In articles by G. McClelland et al, entitled "Atomic Force Microscopy: General Principles and a New Implementation", Rev. Progr. Quart. Non-destr. Eval., vol. 6, 1987, p. 1307 and Y. Martin et al, entitled "Atomic force microscope-force mapping and profiling on a sub 100- Å scale", J. Appl. Phys., vol. 61, no. 10, May 15, 1987, pp 4723–4729, there is described the use of a laser interferometer to measure tip displacement. The advantages of optical detection over tunneling detection of the cantilever beam deflection are increased reliability and ease of implementation, insensitivity to the roughness of the beam, and a smaller sensitivity to thermal drift.

The atomic force microscope has a promising future in research and development and in manufacturing environments because of its unique capabilities of imaging insulators and measuring minute forces. In order to fulfill the promise, the atomic force microscope should be versatile, i.e., operate in vacuum, air or aqueous environments and be reliable, simple, and compact. Moreover, for certain applications atomic resolution and the ability to scan larger areas are additional requirements.

SUMMARY OF THE INVENTION

According to the present invention, a piezoelectric tube is used for scanning a surface and a micromachined cantilever beam is used for supporting the tip. The micromachined cantilever beam orientation is sensed by reflecting a laser beam from the back of the cantilever beam and detecting the reflected laser beam with a position-sensitive detector, preferably a bicell. The laser beam source is preferably, but not necessarily, a single-mode diode laser operating in the visible range. The laser output is coupled into a single-mode optical fiber whose output is focussed onto the back of the cantilever beam. In an alternative embodiment where the tip is supported by one or more arms extending from the end of the cantilever, the laser beam is focussed onto the arm or arms in the region of the tip. The term focussed onto the back of the cantilever will be understood to encompass both focussed onto the back of the cantilever beam itself or onto the arm or arms in the region of the tip. The angle of deflection of the reflected beam is detected with the bicell. Common mode rejection of intensity fluctuations is achieved by symmetrically positioning the bicell with respect to the incoming beam. In the present invention, the positioning is achieved, remotely, by means of an inertial mover as will be described below. Remote positioning of the bicell in ultra-high vacuum environments is essential. Alternatively, in cases where deviation from the center position on the bicell are small compared to the laser beam diameter, common mode rejection can be achieved electronically, e.g., by attaching a variable resistance, in series, to each segment of the bicell to equalize the voltage drop across the resistances, thus providing an electronic equivalent of centering the reflected laser beam on the face of the bicell. The output of the bicell is provided to a computer for processing the data for providing an image of the surface to be investigated with atomic resolution.

The present invention relies upon the measurement of the cantilever beam orientation rather than displacement. A change in position is transformed into an angular change which is inversely proportional to the length of the cantilever. In prior art atomic force microscopes the length of the cantilever beam has been on the order of 1 mm. The micromachined cantilever beam employed in the present invention is on the order of 100 microns in length thereby enabling atomic resolution of the surface to be investigated. When practicing the invention in an environment not requiring a vacuum, simplifications to the arrangement are possible. For example, the optical fiber can be eliminated, resulting in a more compact design. Also, the inertial mover is not required since the microscope components are accessible.

Preferably, the output of the visible diode laser is an elliptical beam with an aspect ratio in the range of approximately 5 to 7:1. While such ellipiticity is generally considered undesirable requiring optical correction, the asymmetric beam shape is advantageously used in practicing the present invention. By appropriately focussing the laser beam on a rectangular cantilever beam, increased sensitivity of the laser beam deflection measurement and a simplified alignment procedure are achieved. An additional advantage of the elliptical beam resides in the ability to use a laser with higher laser power, without exceeding the saturation limit of the bicell, and thereby achieve higher measurement sensitivity. It is also possible to reduce the distance between the cantilever beam and the bicell, thus making the atomic force microscope even more compact. In cases where the beam is not inherently elliptical, as in the case of the light output from an optical fiber, a cylindrical lens can be used to achieve the advantageous elliptical shape.

A principal object of the present invention is, therefore, the provision of sensing the orientation of a micromachined cantilever beam of an atomic force microscope with optical-beam-deflection.

An object of the present invention is the provision of an atomic force microscope employing an inertial mover coupled to a position-sensitive detector.

Another object of the present invention is the provision of a method for combining the use of optical-beam-deflection techniques with the use of microfabricated cantilever beams, including the use of optical fibers to implement the optical-beam-deflection technique.

Further and still other objects of the present invention will become more clearly apparent when the following description is read in conjunction with the accompanying drawings.

DETAILED DESCRIPTION

Atomic force microscopes are known in the art as described, for example, in U.S. Pat. No. 4,724,318 issued to G. Binnig and assigned to the same assignee or the present invention, which patent is incorporated herein by reference. While the Binnig patent describes a method of measuring the tip to surface distance by means of monitoring the tunneling current, the present invention measures the tip orientation by optical-beam-deflection, as will be described hereinafter. The present invention is most advantageous for operation in an inaccessible environment, such as in a vacuum or an ultrahigh vacuum, due to the provision of a remotely positionable position-sensitive detector.

Figure 1:
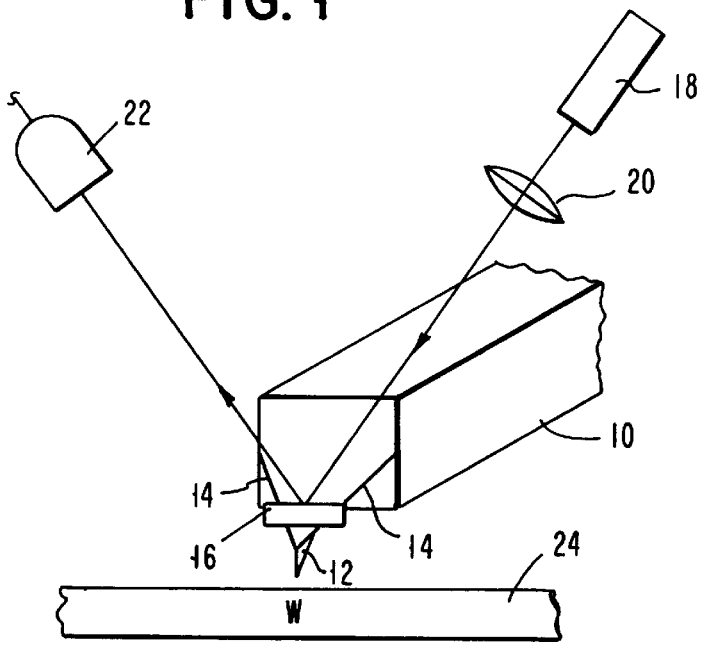
FIG. 1 is a schematic representation of a portion of an atomic force microscope.

Referring now to the figures and to FIG. 1 in particular, there is shown a schematic representation of a cantilever beam deflection detection scheme. A stylus-cantilever system includes a cantilever beam 10 made of, e.g., silicon or silicon nitride, having a tip 12 of a length in the range between 1 and 10 microns, and preferably 5 micrometers in length disposed at the end of a pair of supporting arms 14. Alternatively, the tip 12 can be disposed at the end of single supporting arm extending from end of cantilever beam 10. A laser 18 transmits a laser beam through lens 20 where the beam is focussed directly onto the back of the arms 14 in the region of the tip. In an alternative embodiment (not shown) where the tip extends directly from the cantilever beam, the laser beam is focussed onto the back of the cantilever beam; or, alternatively, onto a reflector 16 attached to the back of the cantilever beam for the purpose of enhancing reflective properties. As used herein, the term "onto the back of the cantilever" will be understood to mean a laser beam transmitted onto the back of the cantilever beam itself, onto the back of a reflector coupled to the back of the cantilever beam, or onto one or more tip supporting arms in the region of the tip. The laser beam is reflected onto a position-sensitive detector 22. The output of the detector 22 is provided as one input to a general purpose computer. The x-axis and y-axis positions of the tip as the tip is scanned over the workpiece surface are also provided as inputs to the computer as is known in the art. The computer, in turn, processes the data in a known manner for providing a topographical image of the surface at atomic resolution. The image can be displayed on a screen or on a strip chart, be in tabular form or otherwise provided in a visual format.

In a preferred embodiment, the laser 18 is a compact single-mode diode laser operating preferably in the visible light spectrum, preferably at 670 nm, for ease of alignment. However, a laser operating in the infrared or ultraviolet range will perform equally as well. The preferred position-sensitive detector is a silicon bicell.

Generally, an atomic force microscope detects the motion of the tip toward and away from a surface to be inspected 24. The motion of the tip is proportional to the interaction force between the tip and surface of the workpiece w. However, in accordance with the present invention, the orientation of the cantilever beam supporting the tip is measured. The measurements can be performed in a vacuum or ultrahigh vacuum, in an aqueous environment or in air depending upon the application. The general atomic force microscope configuration for each environment is well known to those skilled in the art.

Figure 2:
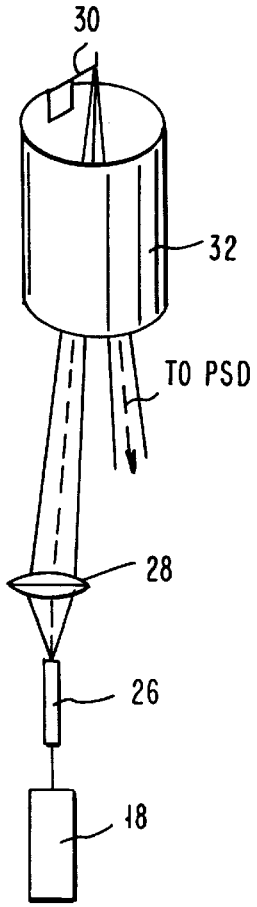
FIG. 2 is a schematic diagram of a portion of an atomic force microscope comprising the present invention.

FIG. 2 illustrates a modification to a conventional atomic force microscope which is most useful when performing measurements in an ultrahigh vacuum environment. However, the microscope will perform in water and in non-vacuum environments equally as well with the modification.

As shown in FIG. 2, the laser beam from laser 18 is coupled to a single mode optical fiber 26 whose output is focussed via lens 28 to a reflector 30 disposed on the back of a cantilever beam. The laser beam is reflected from the reflector to a position sensitive detector. For reference purposes, the side of the cantilever beam including the tip is referred to as the front side of the cantilever beam and the oppositely disposed side of the cantilever beam containing the reflector is referred to as the back of the cantilever beam.

A piezoelectric tube 32 is used as a scanner. The cantilever beam, which is micromachined, has a length in the range between 100 and 200 microns and preferably is 100 microns long, and has a width in the range between 5 and 30 microns and preferably is 20 microns wide. The length and width dimensions are dependent upon the material comprising the cantilever beam and are selected in order to achieve a soft lever configuration of the stylus-cantilever system having a force constant in the range between 0.01 and 100 Newton/meter and preferably having a force constant of 0.1 N/m. The cantilever beam is coupled to the tube scanner 32. Use of a micromachined cantilever beam of small dimension enables imaging at atomic resolution as contrasted with the heretofore employed cantilever beams which were typically on the order of one millimeter in length and were limited in terms of resolution. The described arrangement ensures a high scanning speed and imposes virtually no restriction on the size of a surface to be investigated. The maximum scanning speed is determined by the resonance frequency of the cantilever beam, typically 100 kHz, or by the resonance frequency of the tube scanner, typically 10 kHz.

A preferred position sensitive detector is a bicell and preferably a silicon bicell for detecting the angle of deflection of the laser beam. An inertial mover, as shown in FIG. 3, ensures the rejection of intensity fluctuations of the light falling on the bicell by remotely positioning the bicell symmertrically with respect to the laser beam deflected from the cantilever beam.

The inertial mover includes a piezoelectric bar 36 whose length is varied by the application of a saw-tooth waveform voltage signal to the bar as is known in the art. Mounted on a sapphire plate 38 located near one end of the piezoelectric bar 36 is a bicell 40. In the position shown, the bicell can readily slide responsive to an appropriate saw-tooth waveform voltage signal applied to the piezoelectric bar 36 via conductors (not shown) as is known in the art. The sapphire plate 38 and the bicell 40 coupled thereto will move as the saw-toothed waveform voltage signal is applied to the bar. In this manner, the position of the bicell 40 can be remotely controlled in steps as small as 100 angstroms. The inertial mover is compact and fully computer-controllable which is particularly advantageous for use in ultrahigh vacuum environments.

Figure 3:
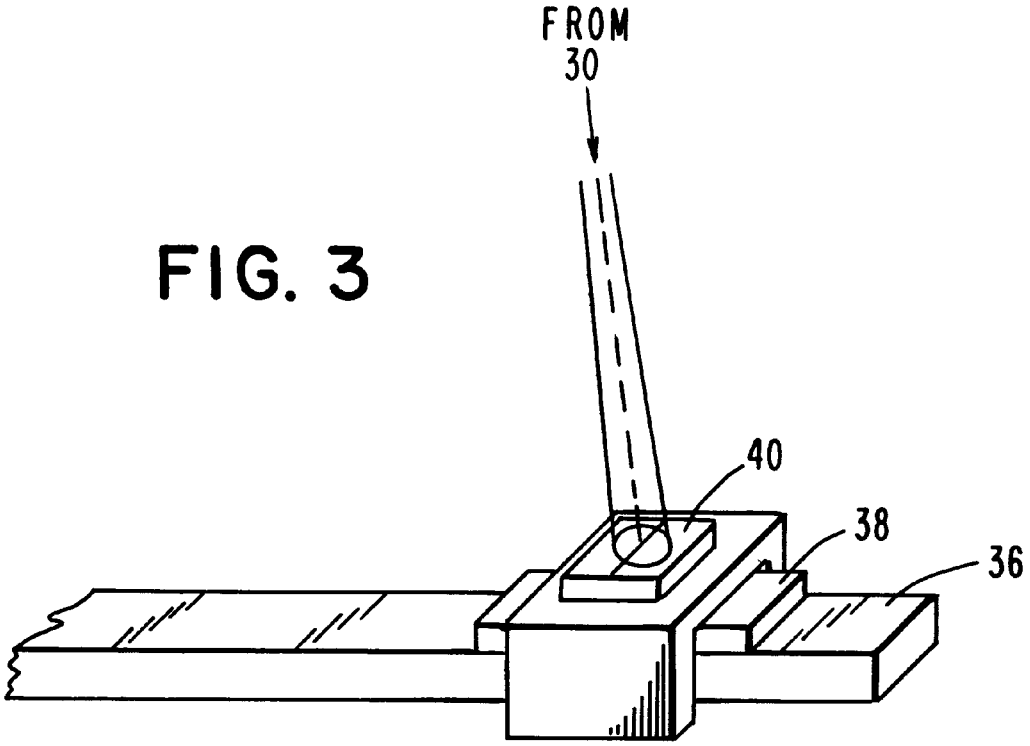
FIG. 3 is a schematic diagram of a preferred position-sensitive detector useful for practicing the present invention.

The use of a scanner and detector of the types described in FIGS. 2 and 3, namely micron-sized micromachined cantilever beams and laser beam deflection, results in an atomic force microscope apparatus that measures the orientation of the cantilever beam rather than its displacement. That is, a change of the cantilever beam position is transformed into an angular change which change is inversely proportional to the length of the cantilever beam, hence making full use of the small size dimensions. Another advantage of the present atomic force microscope design is that all required alignments and adjustments are in excess of 10 microns, a range which is easily achieved with simple standard mechanical tools.

In certain applications, operation in an inaccessible environment such as a vacuum environment is neither required nor desired and the above described design can be simplified. Since the atomic force microscope components are accessible in either a liquid or gas, the optical fiber 26 can be eliminated in order to provide a more compact design. It is possible to eliminate the inertial mover when operating in a non-vacuum environment. A primary function of the inertial mover is to provide the ability to remotely position the bicell in a vacuum chamber. For example, in situ tip replacement can be incorporated in the atomic force microscope design, a feature that could result in significant misalignment of the optical path requiring repositioning of the bicell.

The output of a visible diode laser is an elliptical beam having an aspect ratio in the range of approximately 5 to 7:1. In the prior art, the ellipticity is eliminated by the use of suitable optics. To the contrary, the asymmetric beam shape is an important aspect of an alternative preferred embodiment of the invention.

Figure 4:
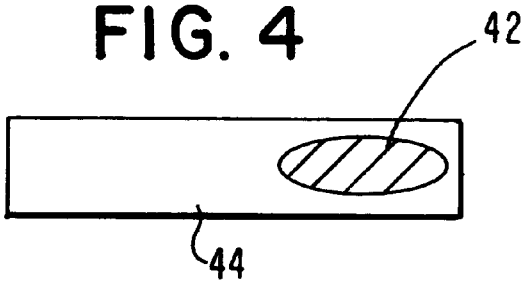
FIG. 4 is an illustration of an elliptical laser beam spot focussed on a micromachined cantilever beam forming a part of an atomic force microscope.
Figure 5:
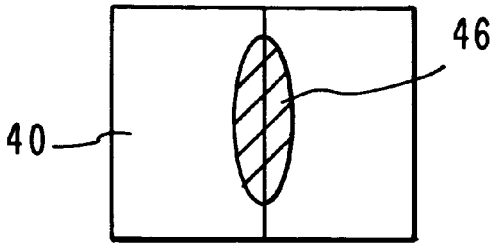
FIG. 5 is an illustration of an elliptical laser beam spot received at a position-sensitive detector.

As shown in FIG. 4, by focussing a spot 42 of an elliptical shaped laser beam on a cantilever beam 44 so that the major axis of the ellipse is substantially parallel to the longitudinal axis of the cantilever beam, the elliptical beam spot reflects from the cantilever beam in accordance with the same aspect ratio and the resultant reflected spot size is approximately six times smaller in the direction perpendicular to the longitudinal axis of the cantilever beam. The result is a geometry which adds the potential for increased sensitivity of the beam deflection arrangement as well as providing for a simplified alignment procedure. *The elongated, or other than circular, shape (e.g., elliptical or asymmetric) light spot of the reflected laser beam 46 at bicell 40 moves in a direction transverse to its elongation dimension when the atomic forces deflect the cantilever beam 44.* Moreover, the size of the reflected laser beam 46 received at the bicell 40 is 5 to 7 times larger in the direction perpendicular to the deflection direction as shown in FIG. 5, thereby enabling the use of higher laser power, without exceeding the saturation limit of the bicell, and correspondingly achieving higher measurement sensitivity. Alternatively, the distance between the cantilever beam and bicell can be decreased, thus resulting in an even more compact microscope.

While there have been described and illustrated an atomic force microscope and several modifications and variations thereof, it will be apparent to those skilled in the art that further modifications and variations are possible without deviating from the broad spirit of the present invention which shall be limited solely by the scope of the claims appended hereto.

What is claimed is:

[1. A method for generating a topographical image of a surface of a workpiece comprising the steps of:

moving a tip which is fixed to one end of a front side of a micromachined cantilever beam toward a surface of a workpiece to be inspected at a distance where the forces occurring between the atoms at the tip and on the workpiece surface deflect the cantilever;

transmitting a laser beam onto a back of the cantilever beam;

detecting the laser beam reflected from the cantilever beam with position-sensitive detection means for converting the reflected beam into an output signal indicative of an angular change of the cantilever beam which change is inversely proportional to the length of the cantilever beam;

scanning the tip relative to the surface, and processing the output signal for providing a topographical image of the workpiece surface.]

[2. The method as set forth in claim 1, wherein said transmitting a laser beam comprises coupling the laser beam to an optical fiber.]

[3. The method as set forth in claim 1, wherein said laser beam is transmitted to a reflector coupled to the back of the cantilever beam.]

[4. The method as set forth in claim 1, wherein said laser beam is transmitted to at least one arm supporting the tip in the region of the tip.]

[5. The method as set forth in claim 1, wherein said position-sensitive detector comprises a bicell.]

[6. The method as set forth in claim 5, wherein said bicell is a silicon bicell.]

[7. The method as set forth in claim 1, wherein said laser beam is in the visible light spectrum.]

[8. The method as set forth in claim 1, wherein the position sensitive detector is remotely positioned from the cantilevered beam.]

9. [The method as set forth in claim 8,] *A method for generating a topographical image of a surface of a workpiece comprising:*

*moving a tip which is fixed to one end of a front side of a micromachined cantilever beam toward a surface of a workpiece to be inspected at a distance where the forces occurring between the atoms at the tip and on the workpiece surface deflect the cantilever;*

*transmitting a laser beam onto a back of the cantilever beam;*

*detecting the laser beam reflected from the cantilever beam with position-sensitive detection means for converting the reflected beam into an output signal indicative of an angular change of the cantilever beam which change is inversely proportional to the length of the cantilever beam;*

*scanning the tip relative to the surface, and*

*processing the output signal for providing the topographical image of the workpiece surface,*

*wherein the position sensitive detector is remotely positioned from the cantilevered beam, and* wherein an inertial mover remotely positions the detector.

10. The method as set forth in claim 9, wherein said moving and said detector are performed in an inaccessible environment.

11. The method as set forth in claim 10, wherein said inaccessible environment is a vacuum or ultrahigh vacuum.

[12. The method as set forth in claim 8, wherein said moving and said detecting are performed in an inaccessible environment.]

[13. The method as set forth in claim 12, wherein said inaccessible environment is a vacuum or ultrahigh vacuum.]

14. [The method as set forth in claim 1] *A method for generating a topographical image of a surface of a workpiece comprising:*

*moving a tip which is fixed to one end of a front side of a micromachined cantilever beam toward a surface of a workpiece to be inspected at a distance where the forces occurring between the atoms at the tip and on the workpiece surface deflect the cantilever;*

*transmitting a laser beam onto a back of the cantilever beam;*

*detecting the laser beam reflected from the cantilever beam with position-sensitive detection means for converting the reflected beam into an output signal indicative of an angular change of the cantilever beam which change is inversely proportional to the length of the cantilever beam;*

*scanning the tip relative to the surface, and*

*processing the output signal for providing the topographical image of the workpiece surface,* wherein said [transmitted] *reflected* laser beam has an elliptical beam shape *at said detection means.*

[15. An atomic force microscope for generating a topographical image of a surface of a workpiece wherein the improvement comprises:

a tip fixed to one end of a front side of a micromachined cantilever beam adapted for being positioned in proximity to the surface of the workpiece where the forces between the atoms of said tip and the surface deflect the cantilever beam;

laser means for transmitting a laser beam to a back of the cantilever beam;

position-sensitive detection means for receiving said laser beam after being reflected from the cantilever beam and for converting the reflected beam into an output signal indicative of an angular change of the cantilever beam which change is inversely proportional to the length of the cantilever beam;

means for causing the tip and surface to undergo relative scanning motion, and computing means coupled to said detection means for generating a topographical image of the surface.]

[16. An atomic force microscope as set forth in claim 15, wherein said laser means comprises an optical fiber for coupling said laser beam to said cantilever beam.]

[17. An atomic force microscope as set forth in claim 15, further comprising reflective means coupled to the back of the cantilever beam for reflecting the transmitted laser beam.]

[18. An atomic force microscope as set forth in claim 15, wherein said tip is fixed to the micromachined cantilever beam by means of at least one arm and said laser means transmits a laser beam to said at least one arm in the region of said tip.]

[19. An atomic force microscope as set forth in claim 15, wherein said position sensitive detection means comprises a bicell.]

[20. An atomic force microscope as set forth in claim 19, wherein said bicell is a silicon bicell.]

[21. An atomic force microscope as set forth in claim 15, wherein said laser means operates in the visible light spectrum.]

[22. An atomic force microscope as set forth in claim 21, where said laser means comprises a single-mode diode laser.]

[23. An atomic force microscope as set forth in claim 15, wherein said position-sensitive detection means is remotely positionable from the cantilever beam.]

24. An atomic force microscope [as set forth in claim 23,] *for generating a topographical image of a surface of a workpiece wherein the improvement comprises:*

*a tip fixed to one end of a front side of a micromachined cantilever beam adapted for being positioned in proximity to the surface of the workpiece where the forces between the atoms of said tip and the surface deflect the cantilever beam;*

*laser means for transmitting a laser beam to a back of the cantilever beam;*

*position-sensitive detection means for receiving said laser beam after being reflected from the cantilever beam and for converting the reflected beam into an output signal indicative of an angular change of the cantilever beam, which change is inversely proportional to the length of the cantilever beam, said position-sensitive detection means being remotely positionable from the cantilever beam, and* wherein said position-sensitive detection means comprises an inertial mover*;*

*means for causing the tip and surface to undergo relative scanning motion; and*

*computing means coupled to said detection means for generating the topographical image of the surface.*

[25. An atomic force microscope as set forth in claim 15, wherein said tip and said position-sensitive detection means are disposed in an inaccessible environment.]

[26. An atomic force microscope as set forth in claim 25, wherein said inaccessible environment is a vacuum or ultrahigh vacuum.]

27. An atomic force microscope [as set forth in claim 15,] *for generating a topographical image of a surface of a workpiece, comprising:*

*a tip fixed to one end of a front side of a micromachined cantilever beam adapted for being positioned in proximity to the surface of the workpiece where the forces between the atoms of said tip and the surface deflect the cantilever beam;*

*laser means for transmitting a laser beam to a back of the cantilever beam;*

*position-sensitive detection means for receiving said laser beam after being reflected from the cantilever beam and for converting the reflected beam into an output signal indicative of an angular change of the cantilever beam, which change is inversely proportional to the length of the cantilever beam;*

*means for causing the tip and surface to undergo relative scanning motion, and*

*computing means coupled to said detection means for generating the topographical image of the surface,* wherein said laser means transmits a laser beam having an elliptical shape to the back of the cantilever beam *and wherein said reflected laser beam has an elliptical shape at said detection means.*

[28. An atomic force microscope as set forth in claim 15, further comprising display means coupled to said computing means for displaying a topographical image of the surface.]

*29. An atomic force microscope for generating a topographical image of a surface of a workpiece comprising:*

*a tip fixed to one end of a front side of a micromachined cantilever beam adapted for being positioned in proximity to the surface of the workpiece where the forces between the atoms of said tip and the surface deflect the cantilever beam;*

*laser means for transmitting a laser beam to a back of the cantilever beam;*

*position-sensitive detection means for receiving said laser beam after being reflected from the cantilever beam and for converting the reflected beam into an output signal indicative of an angular change of the cantilever beam, which change is inversely proportional to the length of the cantilever beam;*

*means for causing the tip and surface to undergo relative scanning motion; and*

*computing means coupled to said detection means for generating the topographical image of the surface,*

*wherein said laser means operates in the visible light spectrum,*

*wherein said laser means comprises a single-mode diode laser, and*

*wherein said reflected beam has a shape other than circular.*

*30. An atomic force microscope for generating a topographical image of a surface of a workpiece, comprising:*

*a tip fixed to one end of a front side of a micromachined cantilever beam adapted for being positioned in proximity to the surface of the workpiece where forces between atoms of said tip and the surface deflect the cantilever beam;*

*laser means for transmitting a laser beam to a back of the cantilever beam;*

*position-sensitive detection means for receiving said laser beam after being reflected from the cantilever beam and for converting the reflected beam into an output signal indicative of an angular change of the cantilever beam, which change is inversely proportional to the length of the cantilever beam, wherein the reflected laser beam has an elongated shaped light spot when incident upon the detection means;*

*means for causing the tip and the surface to undergo relative scanning motion; and*

*computing means, coupled to said detection means, for generating the topographical image of the surface.*

*31. The atomic force microscope of claim 30, wherein the elongated shaped light spot at said detection means moves in a direction transverse to its elongation dimension when the forces deflect the cantilever.*

*32. The atomic force microscope of claim 30, wherein said elongated shaped light spot is elliptical.*

*33. The atomic force microscope of claim 30, wherein said elongated shaped light spot is asymmetric.*

*34. The atomic force microscope of claim 30, wherein the laser means comprises a diode laser.*

*35. The atomic force microscope of claim 30, wherein the laser means produces an elongated shaped light spot when incident on said cantilever.*

*36. A force microscope for generating an image of a surface of a workpiece, comprising:*

*a tip fixed to one end of a front side of a micromachined cantilever beam adapted for being positioned in proximity to the surface of the workpiece where forces between atoms of said tip and the surface deflect the cantilever beam;*

*laser means for transmitting a laser beam to a back of the cantilever beam;*

*position-sensitive detection means for receiving said laser beam after being reflected from the cantilever beam and for converting the reflected beam into an output signal indicative of an angular change of the cantilever beam, which change is inversely proportional to the length of the cantilever beam, wherein the reflected laser beam has an elongated shaped light spot when incident upon the detection means;*

*means for causing the tip and the surface to undergo relative scanning motion; and*

*computing means, coupled to said detection means, for generating the image of the surface.*

*37. The force microscope of claim 36, wherein the elongated shaped light spot at said detection means moves in a direction transverse to its elongated dimension when the forces deflect the cantilever.*

*38. The force microscope of claim 36, wherein said elongated shaped light spot is elliptical.*

*39. The force microscope of claim 36, wherein said elongated shaped light spot is asymmetric.*

*40. The force microscope of claim 36, wherein the laser means comprises a diode laser.*

*41. The force microscope of claim 36, wherein the image comprises a topographical image.*

*42. The force microscope of claim 36, wherein the laser means produces an elongated shaped light spot when incident on said cantilever.*

*43. The force microscope of claim 36, wherein the force microscope comprises an atomic force microscope.*

*44. A method for generating an image of a surface of a workpiece comprising the steps of:*

*positioning a tip fixed to one end of a front side of a micromachined cantilever beam in proximity to the surface of the workpiece where the forces between the atoms of said tip and the surface deflect the cantilever beam;*

*transmitting a laser beam onto a back of the cantilever beam;*

*detecting the laser beam reflected from the cantilever beam with position-sensitive detection means for converting the reflected beam into an output signal indicative of an angular change of the cantilever beam, which change is inversely proportional to the length of the cantilever beam, wherein said reflected light beam produces an elongated shaped light spot when striking said position-sensitive detection means;*

*scanning the tip relative to the surface, and;*

*processing the output signal for providing an image of the surface of the workpiece.*

*45. The method of claim 44, wherein the elongated shaped light spot at said position-sensitive detection means moves in a direction transverse to its elongated dimension when the cantilever moves due to the forces.*

*46. The method of claim 44, wherein said elongated shaped light spot is asymmetrical.*

*47. The method of claim 44, wherein said elongated shaped light spot is elliptical.*

*48. The method of claim 44, wherein said transmitted laser beam is a beam from a diode laser.*

*49. The method of claim 44, wherein said transmitted laser beam produces an elongated shaped light spot when striking said cantilever.*

*50. The method of claim 44, wherein the image is a topographical image.*

* * * * *